US012594832B2

(12) United States Patent
Tsuda et al.

(10) Patent No.: US 12,594,832 B2
(45) Date of Patent: Apr. 7, 2026

(54) DISPLAY CONTROL DEVICE, DISPLAY CONTROL METHOD, AND COMPUTER-READABLE STORAGE MEDIUM

(71) Applicant: TOYOTA JIDOSHA KABUSHIKI KAISHA, Toyota (JP)

(72) Inventors: Hideki Tsuda, Nagoya (JP); Toshinori Aoki, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 169 days.

(21) Appl. No.: 18/236,468

(22) Filed: Aug. 22, 2023

(65) Prior Publication Data

US 2024/0083248 A1 Mar. 14, 2024

(30) Foreign Application Priority Data

Sep. 12, 2022 (JP) ................................. 2022-144473

(51) Int. Cl.
| | |
|---|---|
| *B60K 35/23* | (2024.01) |
| *B60K 35/10* | (2024.01) |
| *B60K 35/22* | (2024.01) |
| *B60K 35/235* | (2024.01) |

(Continued)

(52) U.S. Cl.
CPC ............ *B60K 35/23* (2024.01); *B60K 35/235* (2024.01); *B60K 35/10* (2024.01); *B60K 35/22* (2024.01); *B60K 35/28* (2024.01); *B60K 35/654* (2024.01); *B60K 2360/177* (2024.01); *B60K 2360/21* (2024.01)

(58) Field of Classification Search
None
See application file for complete search history.

(56) References Cited

U.S. PATENT DOCUMENTS

| | | | | |
|---|---|---|---|---|
| 10,606,075 B2 * | 3/2020 | Choi | ................... | G02B 27/0179 |
| 10,845,592 B2 * | 11/2020 | Katagiri | ................ | B60K 35/00 |
| 11,181,743 B2 * | 11/2021 | Nakada | .............. | G02B 27/0172 |

(Continued)

FOREIGN PATENT DOCUMENTS

| | | | | |
|---|---|---|---|---|
| JP | 2018106136 A | * | 7/2018 | ............. B60K 35/00 |
| WO | 2017/046937 A1 | | 3/2017 | |

OTHER PUBLICATIONS

Machine translation of JP 2018106136 A (Year: 2018).*

*Primary Examiner* — James J Lee
*Assistant Examiner* — David Hatch
(74) *Attorney, Agent, or Firm* — Oliff PLC

(57) ABSTRACT

Given that an intersection point of a straight line, which connects a relatively moving body and an eyeball reference position of a driver of a vehicle, and a virtual surface, which includes a virtual display region and is wider than the virtual display region, is defined as a first intersection point, and an intersection point between the virtual display region and a straight line, which connects the eyeball reference position and an AR image, is defined as a second intersection point, a position of the second intersection point is controlled such that a second distance, which is a distance between the first intersection point and the second intersection point, is longer when a first distance, which is a distance between the relatively moving body and the vehicle, is longer than a predetermined value, than when the first distance is the predetermined value.

3 Claims, 9 Drawing Sheets

(51) Int. Cl.
    *B60K 35/28*        (2024.01)
    *B60K 35/65*        (2024.01)

(56)              References Cited

U.S. PATENT DOCUMENTS

2017/0169612 A1 * 6/2017 Cashen ................... G06T 19/20
2018/0286094 A1 10/2018 Shishido et al.
2025/0083525 A1 * 3/2025 Momiyama ............. G09G 5/38

* cited by examiner 261                    262

26

361

36

1

DISPLAY CONTROL DEVICE, DISPLAY CONTROL METHOD, AND COMPUTER-READABLE STORAGE MEDIUM

CROSS-REFERENCE TO RELATED APPLICATION

This application is based on and claims priority under 35 USC § 119 from Japanese Patent Application No. 2022-144473 filed on Sep. 12, 2022, the disclosure of which is incorporated by reference herein.

BACKGROUND

Technical Field

The present disclosure relates to a display control device, a display control method, and a computer-readable storage medium.

Related Art

International Publication No. 2017/046937 (Patent Document 1) discloses a head-up display that forms an image relating to a preceding vehicle that is positioned in front of a vehicle. In cases in which the distance between the vehicle, in which the head-up display is installed, and the preceding vehicle is large, the head-up display makes the degree of enhancement of the enhanced display of the formed image high as compared to cases in which the distance is short.

A case of applying the above-described technical concept of Patent Document 1 to augmented reality type head-up displays (hereinafter called AR-HUDs) that are installed in vehicles is supposed. Namely, a case in which an AR-HUD forms an AR image corresponding to a preceding vehicle in a virtual display region that is set in front of the vehicle is supposed.

The size of the virtual display region is fixed. Therefore, if the distance between the vehicle in which the AR-HUD is installed and the preceding vehicle becomes long, the driver of the vehicle will become unable to see the preceding vehicle through the virtual display region. Namely, in this case, the driver looks at the preceding vehicle through a space that is at the outer side of the virtual display region. In a case in which the driver views the preceding vehicle in such a mode, it tends to become difficult to display an AR image corresponding to the preceding vehicle in the virtual display region. Moreover, when the distance between the vehicle and the preceding vehicle changes, it is easy for the driver to feel that the distance between the AR image and the preceding vehicle is changing.

SUMMARY

In view of the above-described circumstances, an object of the present disclosure is to provide a display control device, a display control method, and a program that, in a case in which the distance between a vehicle and a relatively moving body, which is positioned in front of the vehicle and moves relative to the vehicle, changes, make it easy to display an AR image corresponding to the relatively moving body in a virtual display region, and, when the distance between the vehicle and the preceding vehicle changes, make it difficult for the driver to feel that the distance between the AR image and the preceding vehicle is changing.

A display control device relating to a first aspect is a display control device installed in a vehicle and forming, in a virtual display region set in front of the vehicle, an AR image corresponding to a relatively moving body that is positioned ahead of the vehicle and moves relative to the vehicle, wherein, given that an intersection point of a straight line, which connects the relatively moving body and an eyeball reference position of a driver of the vehicle, and a virtual surface, which includes the virtual display region and is wider than the virtual display region, is defined as a first intersection point, and an intersection point between the virtual display region and a straight line, which connects the eyeball reference position and the AR image, is defined as a second intersection point, the display control device controls a position of the second intersection point such that a second distance, which is a distance between the first intersection point and the second intersection point, is longer when a first distance, which is a distance between the relatively moving body and the vehicle, is longer than a predetermined value, than when the first distance is the predetermined value.

The display control device relating to the first aspect controls the position of the second intersection point such that the second distance, which is the distance between the first intersection point and the second intersection point, is longer when the first distance that is a distance between the relatively moving body and the vehicle is longer than a predetermined value, than when the first distance is the predetermined value. Therefore, even in a case in which the driver of the vehicle views the relatively moving body through a space at the outer side of the virtual display region due to the first distance becoming long, it is easy for the display control device to display the AR image corresponding to the relatively moving body in the virtual display region. Further, when the first distance is long, the second distance is long, and, when the first distance is short, the second distance is short. Therefore, when the distance between the vehicle and the relatively moving body changes, it is difficult for the driver to feel that the distance between the AR image and the relatively moving body is changing.

In a display control device relating to a second aspect, in the first aspect, the longer the first distance is, the longer the second distance is made to be.

The longer the first distance, the longer the display control device relating to the second aspect makes the second distance. Therefore, the display control device relating to the second aspect can more easily display the AR image corresponding to the relatively moving body in the virtual display region in a case in which the distance between the vehicle and the relatively moving body changes, and can make it difficult for the driver to feel that the distance between the AR image and the preceding vehicle is changing when the distance between the vehicle and the preceding vehicle changes.

In a display control device relating to a third aspect, in the first or second aspect, the second distance is changed in steps, in accordance with a length of the first distance.

In the display control device relating to the third aspect, the second distance is changed in steps in accordance with the length of the first distance. Therefore, the display control device relating to the third aspect can more easily display the AR image corresponding to the relatively moving body in the virtual display region in a case in which the distance between the vehicle and the relatively moving body changes, and can make it difficult for the driver to feel that the distance between the AR image and the preceding vehicle is changing when the distance between the vehicle and the preceding vehicle changes.

A display control method relating to a fourth aspect is a display control method forming, in a virtual display region set in front of a vehicle, an AR image corresponding to a relatively moving body that is positioned ahead of the vehicle and moves relative to the vehicle, wherein, given that an intersection point of a straight line, which connects the relatively moving body and an eyeball reference position of a driver of the vehicle, and a virtual surface, which includes the virtual display region and is wider than the virtual display region, is defined as a first intersection point, and an intersection point between the virtual display region and a straight line, which connects the eyeball reference position and the AR image, is defined as a second intersection point, the display control method controls a position of the second intersection point such that a second distance, which is a distance between the first intersection point and the second intersection point, is longer when a first distance, which is a distance between the relatively moving body and the vehicle, is longer than a predetermined value, than when the first distance is the predetermined value.

A program that is stored on a computer-readable storage medium relating to a fifth aspect is a program causing a computer to execute a processing of forming, in a virtual display region set in front of a vehicle, an AR image corresponding to a relatively moving body that is positioned ahead of the vehicle and moves relative to the vehicle, wherein, given that an intersection point of a straight line, which connects the relatively moving body and an eyeball reference position of a driver of the vehicle, and a virtual surface, which includes the virtual display region and is wider than the virtual display region, is defined as a first intersection point, and an intersection point between the virtual display region and a straight line, which connects the eyeball reference position and the AR image, is defined as a second intersection point, the program causes the computer to execute a processing of controlling a position of the second intersection point such that a second distance, which is a distance between the first intersection point and the second intersection point, is longer when a first distance, which is a distance between the relatively moving body and the vehicle, is longer than a predetermined value, than when the first distance is the predetermined value.

As described above, the display control device, display control method and program relating to the present disclosure have the excellent effects of, in a case in which the distance between a vehicle and a relatively moving body, which is positioned in front of the vehicle and moves relative to the vehicle, changes, easily displaying an AR image corresponding to the relatively moving body in a virtual display region, and, when the distance between the vehicle and a preceding vehicle changes, making it difficult for the driver to feel that the distance between the AR image and the preceding vehicle is changing.

DETAILED DESCRIPTION

Figure 1:
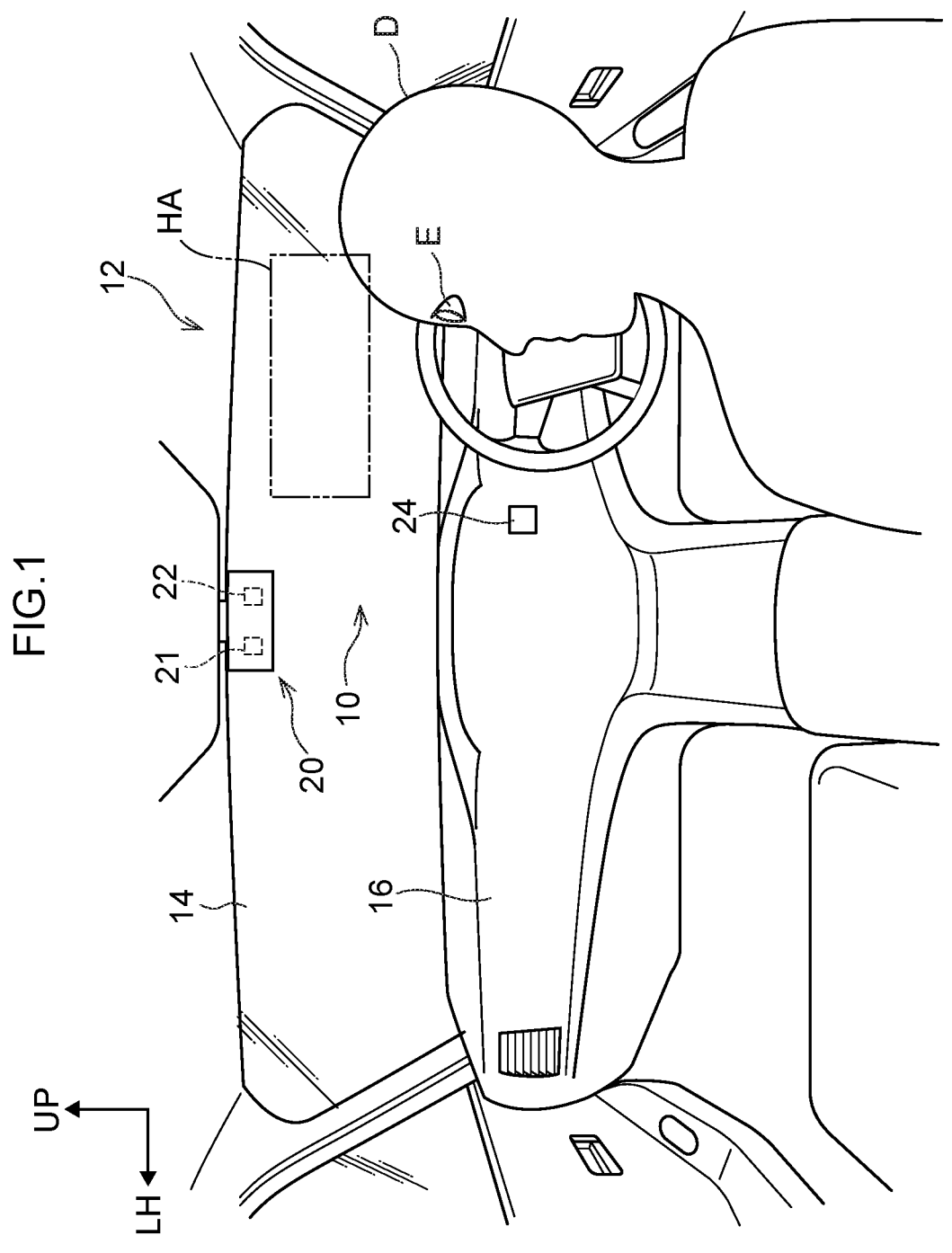
FIG. 1 is drawing illustrating the interior of a vehicle that is equipped with a display control device relating to an embodiment.

Embodiments of a display control device 10, a display control method and a program relating to the present invention are described hereinafter with reference to the drawings. Arrow FR that is shown appropriately in the drawings indicates the front side in the vehicle longitudinal direction, arrow LH indicates the left side in the vehicle left-right direction, and arrow UP indicates the upper side in the vehicle vertical direction.

The display control device 10 of the present embodiment has a display control ECU 26 and a projecting device 30 that are described later. As illustrated in FIG. 1, a vehicle 12 in which the display control device 10 is installed has a front windshield 14 and an instrument panel 16. A drive support switch 24 is provided at the instrument panel 16. A sensor unit 20 is provided at the upper portion of the vehicle inner side surface of the front windshield 14. The sensor unit 20 has a camera 21 and a millimeter-wave sensor 22. The camera 21 can capture images of subjects that are positioned further toward the vehicle front side than the camera 21 itself. The millimeter-wave sensor 22 transmits search waves forward, and receives reflected waves. The drive support switch 24 is a switch for causing the vehicle 12 to execute drive support control that is described later.

Figure 2:
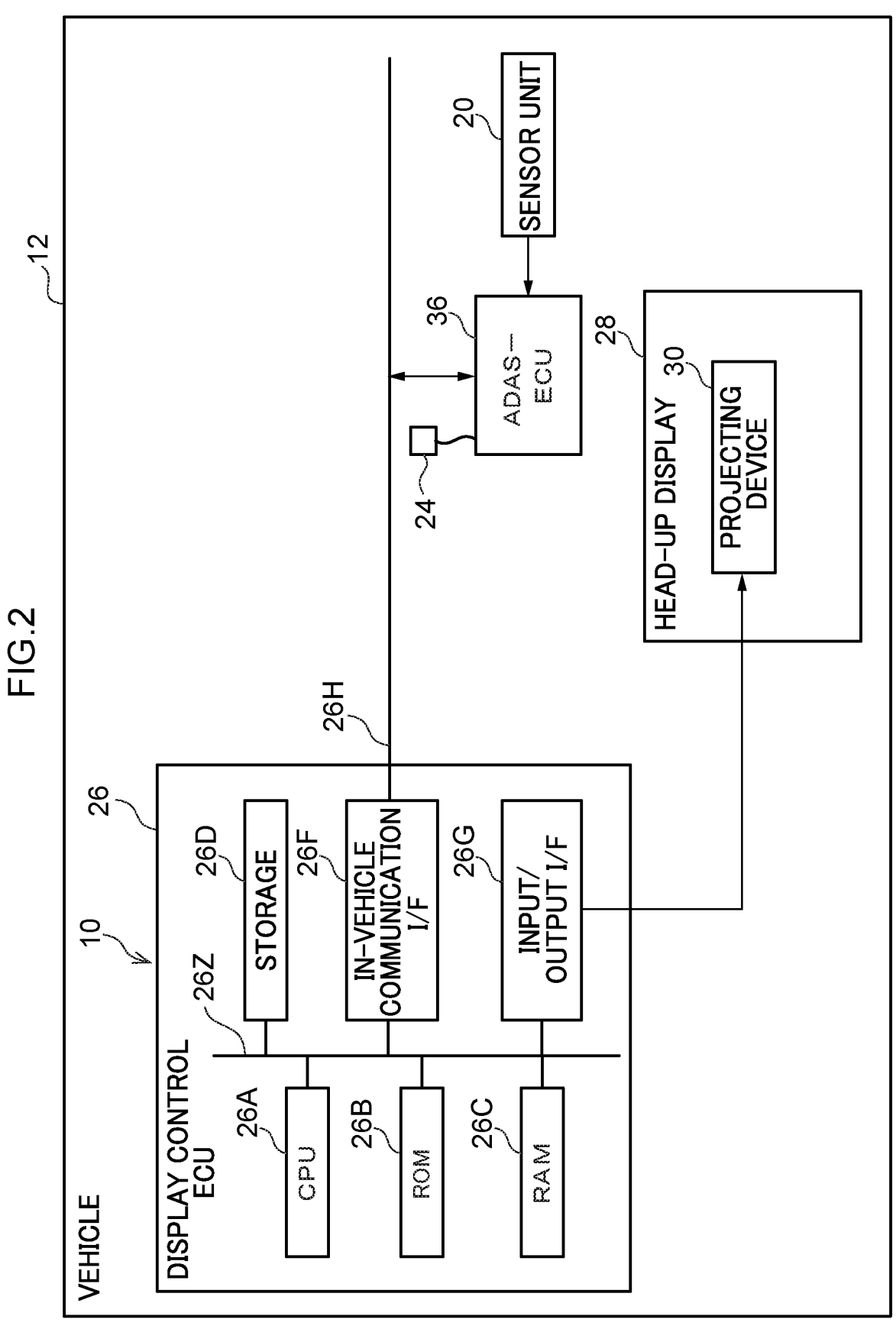
FIG. 2 is a drawing illustrating hardware structures of the vehicle illustrated in FIG. 1.

As illustrated in FIG. 2, in addition to the sensor unit 20 and the drive support switch 24, that vehicle 12 has the display control ECU 26, a head-up display (called HUD hereinafter) 28 and an ADAS-ECU 36, as hardware structures thereof.

The display control ECU 26 is structured to include a CPU (Central Processing Unit) 26A, a ROM (Read Only Memory) (non-transitory storage medium) (storage medium) 26B, a RAM (Random Access Memory) 26C, a storage (non-transitory storage medium) (storage medium) 26D, an in-vehicle communication I/F 26F, and an input/output I/F 26G. The CPU 26A, the ROM 26B, the RAM 26C, the storage 26D, the in-vehicle communication I/F 26F and the input/output I/F 26G are connected so as to be able to communicate with one another via internal bus 26Z.

The CPU 26A is a central computing processing unit, and executes various programs and controls the respective sections. The CPU 26A reads-out a program from the ROM 26B or the storage 26D, and executes the program by using the RAM 26C as a workspace. The CPU 26A carries out control of the respective structures, and various computing processings, in accordance with programs recorded in the ROM 26B or the storage 26D.

The ROM 26B stores various programs and various data. The RAM 26C temporarily stores programs and data as a workspace. The storage 26D is structured by a storage device such as an HDD (Hard Disk Drive) or an SSD (Solid State Drive) or the like, and stores various programs and various data.

The in-vehicle communication I/F 26F is an interface for connecting with the ADAS-ECU 36 via an external bus 26H. Communication standards in accordance with CAN protocol for example are used at this interface.

The input/output I/F 26G is an interface for communication with the HUD 28.

Figure 3:
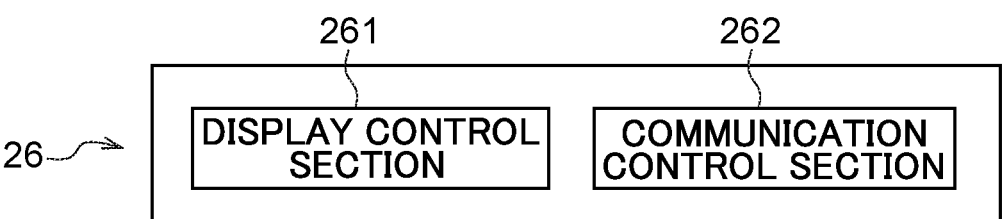
FIG. 3 is a functional block drawing of a display control ECU illustrated in FIG. 2.

An example of functional structures of the display control ECU 26 is illustrated in a block drawing in FIG. 3. The display control ECU 26 has a display control section 261 and a communication control section 262 as the functional structures thereof. The display control section 261 and the communication control section 262 are realized due to the CPU 26A reading-out and executing a program stored in the ROM 26B.

The display control section 261 controls the HUD 28. Detailed description of the functions of the display control section 261 is given later.

The communication control section 262 controls the in-vehicle communication I/F 26F.

The ADAS-ECU 36 is structured to include a CPU, a ROM (non-transitory storage medium) (storage medium), a RAM, a storage (non-transitory storage medium) (storage medium), an in-vehicle communication I/F, and an input/output I/F. These are connected so as to be able to communicate with one another via an internal bus.

The ADAS-ECU 36 is connected to the sensor unit 20. Further, the ADAS-ECU 36 is connected to various actuators that are for driving the brake device and the steering device. The vehicle 12 has an electric motor as the drive source thereof. The ADAS-ECU 36 is connected to the electric motor (actuator).

Figure 4:
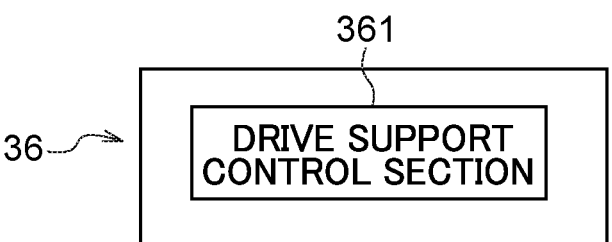
FIG. 4 is a functional block drawing of an ADAS-ECU illustrated in FIG. 2.

An example of the functional structures of the ADAS-ECU 36 is illustrated in a block drawing in FIG. 4. The ADAS-ECU 36 has a drive support control section 361 as the functional structure thereof. The drive support control section 361 is realized by the CPU reading-out and executing a program stored in the ROM.

Due to the drive support control section 361 controlling the above-described group of actuators, the vehicle 12 executes drive support control of levels 1 through 5 that are set by SAE (Society of Automotive Engineers). For example, the vehicle 12 can execute ACC (Adaptive Cruise Control) and CACC (Cooperative Adaptive Cruise Control). The drive support switch 24 is switched between an on state and an off state by being operated by a vehicle occupant. When the drive support switch 24 is set in the on state, the vehicle 12 can execute drive support control. Moreover, due to the drive support switch 24 that is in the on state being operated, the vehicle occupant can cause the vehicle 12 to execute an arbitrary drive support control among controls of levels 1 through 5.

Here, cases in which the vehicle 12 is traveling forward on a rectilinear road 50, and a preceding vehicle 40 that is positioned in front of the vehicle 12 is traveling forward on the road 50, are supposed as illustrated in FIG. 5 through FIG. 10. In this case, when the vehicle 12 executes ACC due to the drive support switch 24 being operated, on the basis of data transmitted from the sensor unit 20 to the ADAS-ECU 36, the drive support control section 361 recognizes the relative position (the relative distance) of the preceding vehicle 40 with respect to the vehicle 12. Moreover, the drive support control section 361 controls the above-described group of actuators such that the inter-vehicle distance between the vehicle 12 and the preceding vehicle 40 is maintained at a set distance that is an inter-vehicle distance that a vehicle occupant has set by using the drive support switch 24.

The functions of the display control section 261 are described in detail next.

On the basis of information relating to the aforementioned relative position of the preceding vehicle 40 that is received from the ADAS-ECU 36 during execution of ACC, the display control section 261 recognizes the relative position of the preceding vehicle 40 with respect to the vehicle 12. Here, virtual surface VA that is illustrated in FIG. 5 through FIG. 10 is explained. The virtual surface VA, which is set at a position that is further forward than the front windshield 14 by a predetermined, fixed distance, is a rectangle that is long laterally. The fixed distance is an arbitrary distance of between 10 to 15 m for example. When viewed in the left-right direction, the virtual surface VA is a virtual region that is planar and that is inclined with respect to the longitudinal direction and the vertical direction.

On the basis of the aforementioned relative position of the preceding vehicle 40 and the position of the vehicle 12, the display control section 261 calculates first straight line L1 that is a straight line connecting an eyeball reference position Pe and a central position of the preceding vehicle 40, and first intersection point CP1 that is the point of intersection of the first straight line L1 and the virtual surface VA. Here, the eyeball reference position Pe is a predetermined position that is set in the space within the vehicle 12. Note that the first straight line L1 may be a straight line that connects the eyeball reference position Pe and a region (a point) that is different than the central position of the preceding vehicle 40.

Moreover, the display control section 261 controls the HUD 28 that has the projecting device 30. Projected object data, which includes various letters and icons (graphics) and the like, is stored in the ROM 26B or the storage 26D of the display control ECU 26. The projecting device 30 that is controlled by the display control section 261 projects various types of AR images by reading-in projected object data from the ROM 26B or the storage 26D of the display control ECU 26. 2D images and 3D images are included among these AR images. Namely, the HUD 28 is an AR-HUD (Augmented Reality Head-Up Display). The projecting device 30 that has read-in the projected object data projects an AR image. The AR image projected by the projecting device 30 is reflected forward by a reflecting portion (not illustrated) provided at the vehicle 12. Moreover, the AR image reflected forward by the reflecting portion is formed as virtual image VI in virtual display region HA (see FIG. 5 through FIG. 10) that is positioned in front of the front windshield 14. Hereinafter, this virtual image is called AR image VI. The virtual display region HA is a virtual region that is planar, is positioned on the virtual surface VA, and is smaller than the virtual surface VA. The virtual surface VA is a rectangle that is long laterally.

Figure 8:
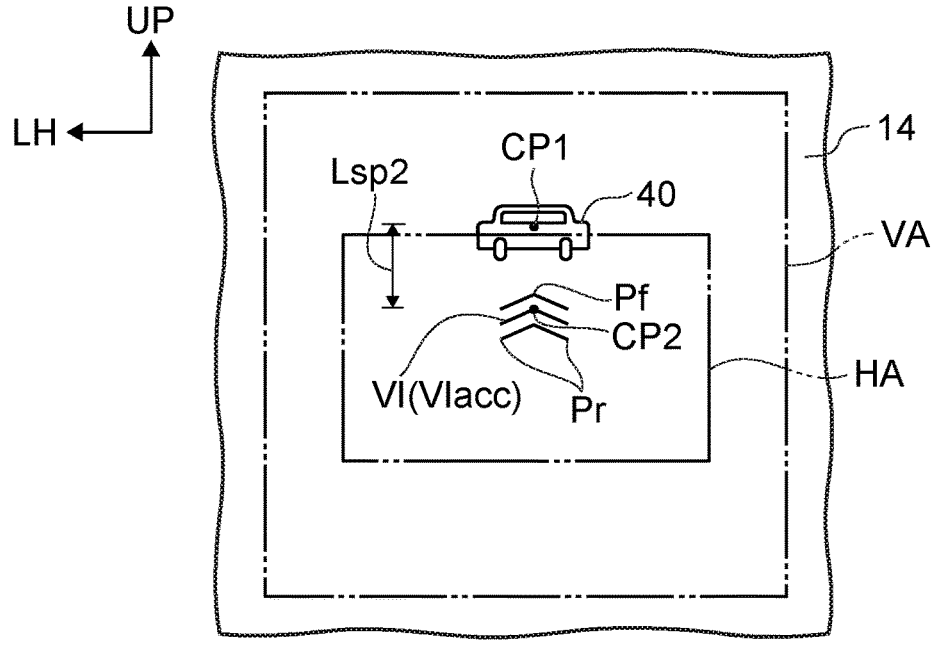
FIG. 8 is a schematic drawing illustrating the virtual display region (virtual surface) seen from the side of the driver of the vehicle of FIG. 7.
Figure 9:
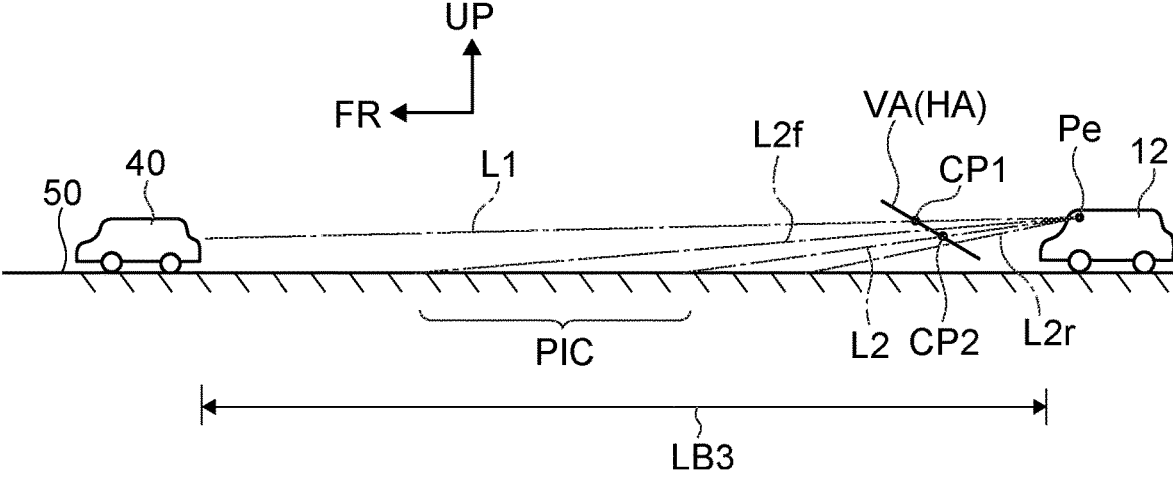
FIG. 9 is a side view that is similar to FIG. 5 and illustrates a case in which the inter-vehicle distance between the vehicle and the preceding vehicle is longer than in FIG. 7.

Here, an ACC image VIacc (see FIG. 6, FIG. 8 and FIG. 10), which is the 3D AR image VI that is displayed in the virtual display region HA when the vehicle 12 executes ACC, is described. The ACC image VIacc has three images that are each substantially V-shaped. The display control section 261 controls the projecting device 30 such that the ACC image VIacc is formed at a predetermined position on the virtual display region HA. Here, the straight line that connects the eyeball reference position Pe and the central point of the ACC image VIacc at the virtual surface VA is defined as second straight line L2. Moreover, the point of intersection (the central point of the ACC image VIacc) of the second straight line L2 and the virtual display region HA is defined as second intersection point CP2. In this case, the display control section 261 calculates the position of the second intersection point CP2 such that the relative position of the second intersection point CP2 with respect to the first intersection point CP1 on the virtual surface VA becomes a predetermined position, and controls the projecting device 30 such that the central point of the ACC image VIacc coincides with the second intersection point CP2. Namely, the display control section 261 controls the projecting device 30 such that the position of the second intersection point CP2 on the virtual display region HA is changed each time that the relative position between the vehicle 12 and the preceding vehicle 40 changes. When an intermediate position of left and right eyes E (see FIG. 1) of a driver D seated in the driver's seat (not illustrated) is positioned at the eyeball reference position Pe or in a vicinity of the eyeball reference position Pe, the driver D who looks at the ACC image VIacc projected on the virtual display region HA visually perceives (has the illusion) that a three-dimensional image PIC (see FIG. 5, FIG. 7 and FIG. 9) is formed (superposed) on a region between the preceding vehicle 40 and the vehicle 12 on the road 50. In other words, the driver D perceives (has the illusion) that the image PIC is moving on the road 50 so as to follow the preceding vehicle 40, in accordance with the change in the relative position between the vehicle 12 and the preceding vehicle 40. Therefore, the driver D who views the ACC image VIacc can recognize that the preceding vehicle 40 is the vehicle that is the object of following of the vehicle 12. Note that straight line L2f shown in FIG. 5, FIG. 7 and FIG. 9 is a straight line that passes-through the eyeball reference position Pe and a front end point Pf of the ACC image VIacc, and straight line L2r is a straight line that passes-through the eyeball reference position Pe and a rear end point Pr of the ACC image VIacc.

Figure 10:
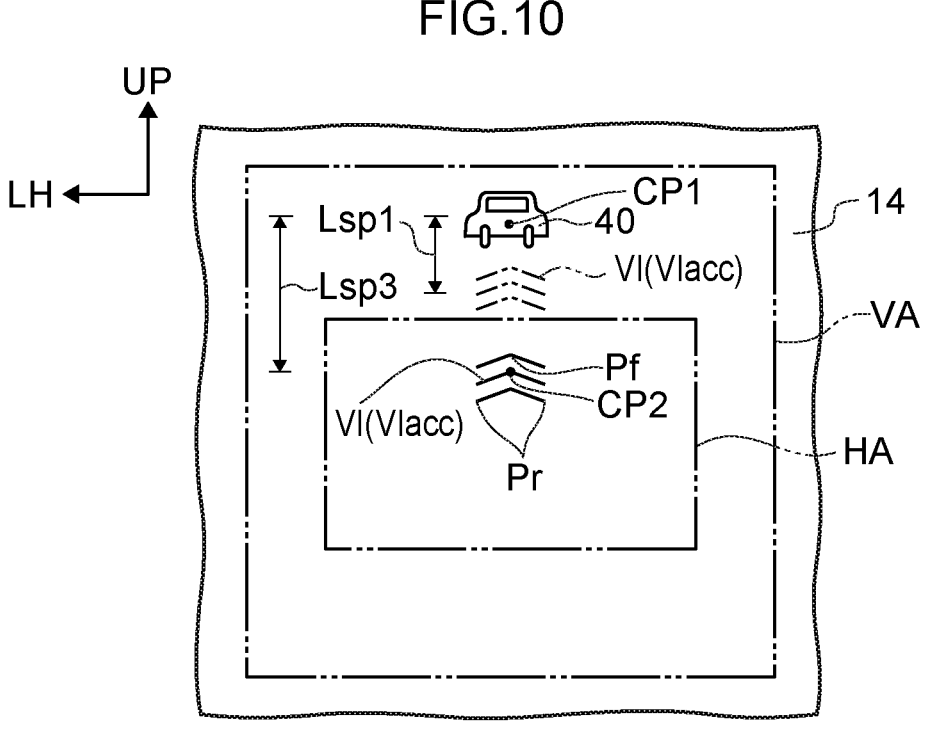
FIG. 10 is a schematic drawing illustrating the virtual display region (virtual surface) seen from the side of the driver of the vehicle of FIG. 9.

By the way, there are cases in which the vehicle speed of the preceding vehicle 40 changes, and the inter-vehicle distance between the vehicle 12 and the preceding vehicle 40 changes. For example, the distance between the vehicle 12 and the preceding vehicle 40 illustrated in FIG. 5 and FIG. 6 is inter-vehicle distance LB1, the distance between the vehicle 12 and the preceding vehicle 40 illustrated in FIG. 7 and FIG. 8 is inter-vehicle distance LB2, and the distance between the vehicle 12 and the preceding vehicle 40 illustrated in FIG. 9 and FIG. 10 is inter-vehicle distance LB3. The inter-vehicle distance LB1<the inter-vehicle distance LB2<the inter-vehicle distance LB3. As illustrated in FIG. 6, in a case in which the distance is the inter-vehicle distance LB1, the driver D views the preceding vehicle 40 through the virtual display region HA. As illustrated in FIG. 8, in a case in which the distance is the inter-vehicle distance LB2, the driver D views the lower half of the preceding vehicle 40 through the virtual display region HA, and views the upper half of the preceding vehicle 40 through the upper region of the virtual surface VA. As illustrated in FIG. 10, in a case in which the distance is the inter-vehicle distance LB3, the driver D views the preceding vehicle 40 through the upper region of the virtual surface VA.

Figure 5:
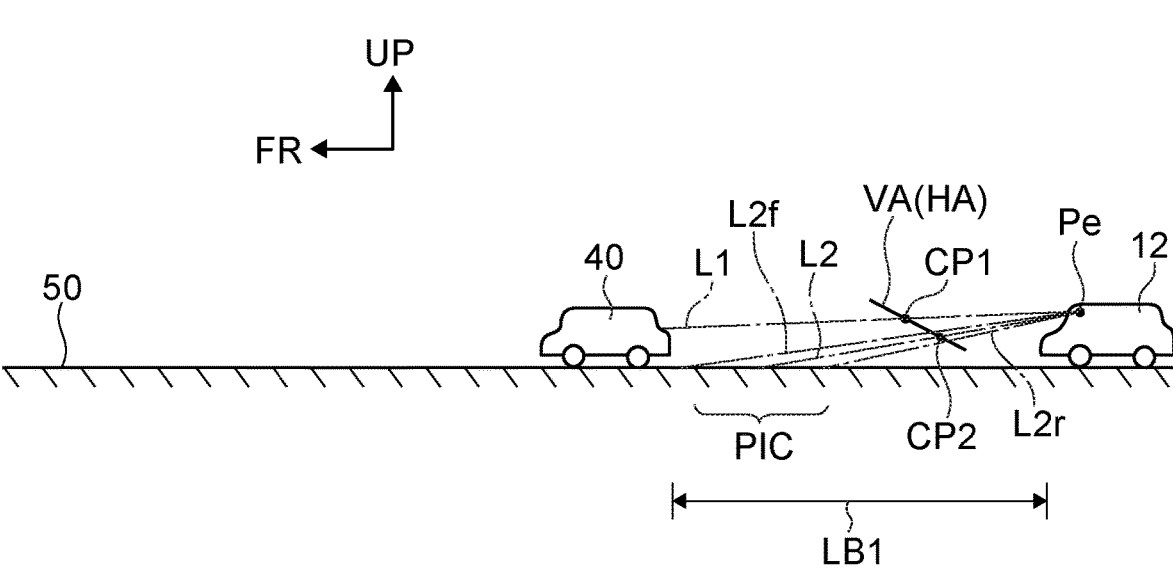
FIG. 5 is a schematic side view of the vehicle and a preceding vehicle that are traveling on a road.
Figure 6:
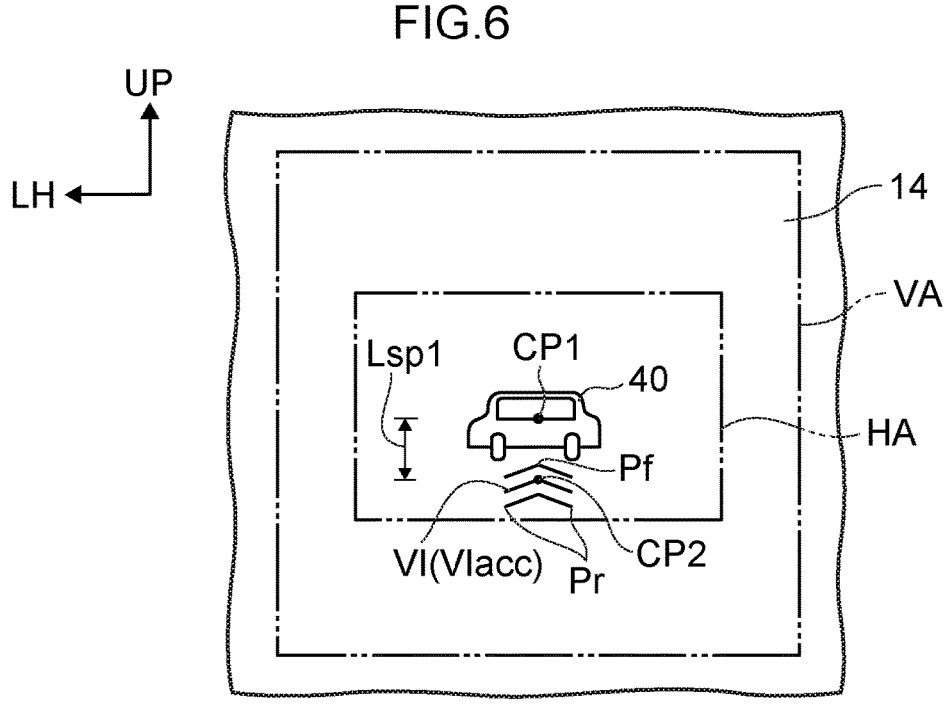
FIG. 6 is a schematic drawing illustrating a virtual display region (virtual surface) seen from the side of the driver of the vehicle of FIG. 5.
Figure 7:
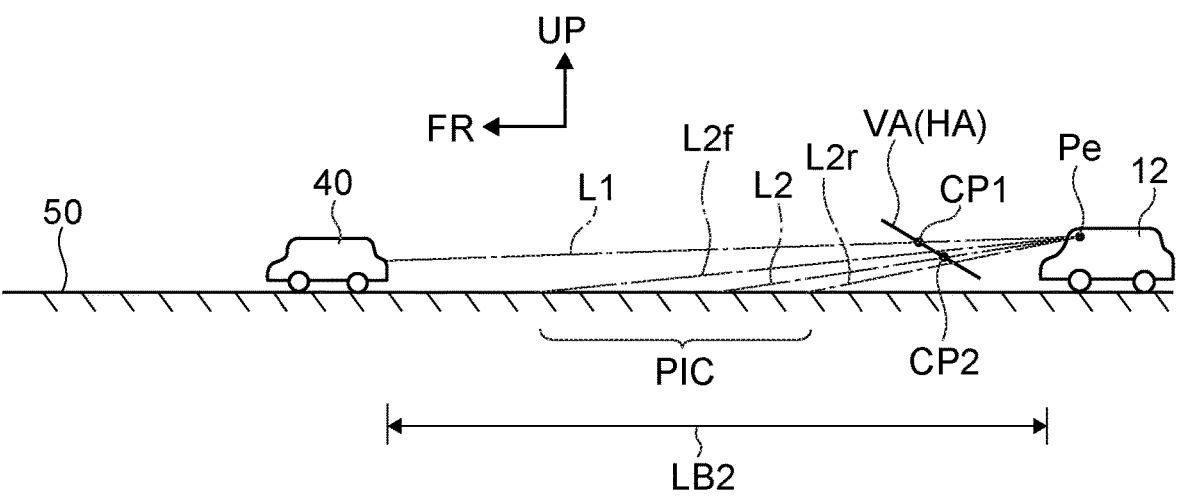
FIG. 7 is a side view that is similar to FIG. 5 and illustrates a case in which the inter-vehicle distance between the vehicle and the preceding vehicle is longer than in FIG. 5.

The distance between the first intersection point CP1 and the second intersection point CP2 in the virtual surface VA in the case illustrated in FIG. 5 and FIG. 6 is distance Lsp1 between the intersection points (second distance). The distance between the first intersection point CP1 and the second intersection point CP2 in the virtual surface VA in the case illustrated in FIG. 7 and FIG. 8 is distance Lsp2 between the intersection points (second distance). The distance between the first intersection point CP1 and the second intersection point CP2 in the virtual surface VA in the case illustrated in FIG. 9 and FIG. 10 is distance Lsp3 between the intersection points (second distance). The driver D has the illusion that the front-rear dimension of image PIC in a case in which the distance between the first intersection point CP1 and the second intersection point CP2 is the distance Lsp2 between the intersection points, is greater than the front-rear dimension of the image PIC in a case in which the distance between the first intersection point CP1 and the second intersection point CP2 is the distance Lsp1 between the intersection points. Similarly, the driver D has the illusion that the front-rear dimension of the image PIC in a case in which the distance between the first intersection point CP1 and the second intersection point CP2 is the distance Lsp3 between the intersection points, is greater than the front-rear dimension of the image PIC in a case in which the distance between the first intersection point CP1 and the second intersection point CP2 is the distance Lsp2 between the intersection points.

When the vehicle 12 executes ACC in this way, the display control ECU 26 controls the position of the second intersection point CP2 in the virtual display region HA such that the distance Lsp1, Lsp2, Lsp3 between the intersection points that is the distance between the first intersection point CP1 and the second intersection point CP2 is longer when the inter-vehicle distance between the vehicle 12 and the preceding vehicle 40 is a value (e.g., the inter-vehicle distance LB2) that is longer than a predetermined value (e.g., the inter-vehicle distance LB1), than when the inter-vehicle distance is the predetermined value. In more detail, the display control ECU 26 controls the position of the second intersection point CP2 such that, the longer the inter-vehicle distance between the vehicle 12 and the preceding vehicle 40 becomes, the longer the distance Lsp1, Lsp2, Lsp3 between the intersection points is made to be.

(Operation and Effects)

Operation and effects of the present embodiment are described next.

The processing executed by the CPU 26A of the display control ECU 26 is described next. The CPU 26A repeatedly executes the processing of the flowchart illustrated in FIG. 11, each time that a predetermined time period elapses.

In step S10 (hereinafter, the word "step" will be omitted), the CPU 26A judges whether or not the vehicle 12 (the ADAS-ECU 36) is currently executing ACC. If the judgement in step S10 is Yes, the CPU 26A moves on to step S11.

In S11, on the basis of the information received from the ADAS-ECU 36, the CPU 26A judges whether or not the relative position of the preceding vehicle 40 with respect to the vehicle 12 is recognized. If the judgement in S11 is Yes, the CPU 26A moves on to S12.

In S12, by using the information received from the ADAS-ECU 36, the CPU 26A calculates the position of the first intersection point CP1 in the virtual surface VA.

The CPU 26A that has completed the processing of S12 moves on to S13, and calculates the second intersection point CP2 that is the position of the central point of the ACC image VIacc on the virtual display region HA.

The CPU 26A that has completed the processing of S13 moves on to S14, and causes the projecting device 30 to project the AR image VI. Due thereto, the ACC image VIacc is formed on the virtual display region HA.

Figure 11:
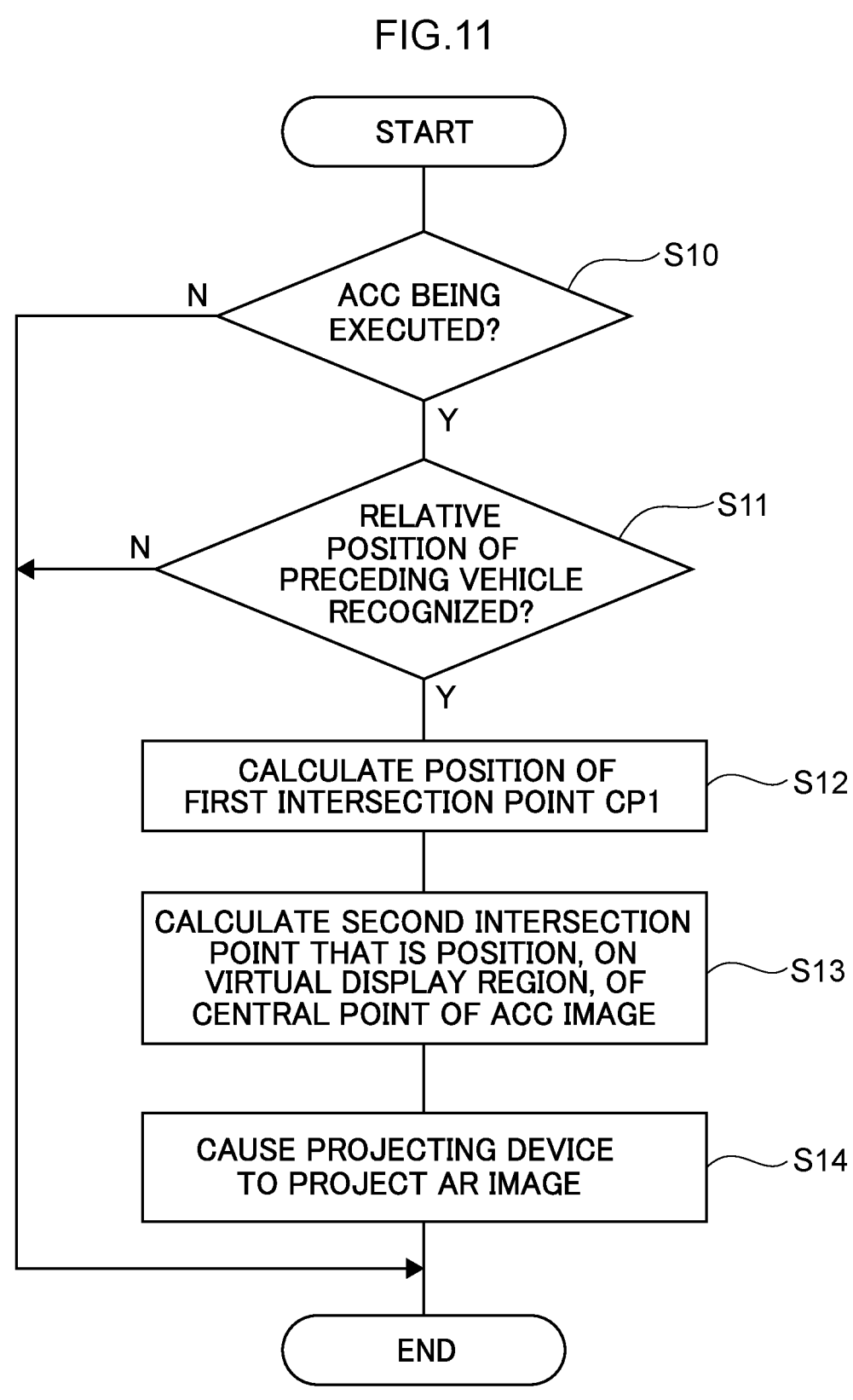
FIG. 11 is a flowchart illustrating processing executed by a CPU of the display control ECU.

If the judgement in S10 or S11 is No, or when the processing of S14 is ended, the CPU 26A ends the processing of the flowchart of FIG. 11 for the time being.

Here, a case is supposed in which the distance between the intersection points is constant at Lsp1 even if the inter-vehicle distance between the vehicle 12 and the preceding vehicle 40 changes. In this case, for example, the position (region), which is apart by the distance Lsp1 between the intersection points from the first intersection point CP1 of the case in which the distance between the vehicle 12 and the preceding vehicle 40 becomes LB3 as illustrated in FIG. 9, is the upper region of the virtual surface VA as illustrated by the imaginary line in FIG. 10. However, the ACC image VIacc can be formed only in the virtual display region HA. Namely, in this case, the display control device 10 cannot display the ACC image VIacc in the virtual display region HA.

In contrast, while the vehicle 12 is executing ACC, the display control device 10 of the present embodiment controls the position of the second intersection point CP2 on the virtual display region HA such that, the longer the inter-vehicle distance between the vehicle 12 and the preceding vehicle 40, the longer the distance Lsp1, Lsp2, Lsp3 between the intersection points becomes. Therefore, even in a case in which the driver D of the vehicle 12 views the preceding vehicle 40 through a space (the upper region of the virtual surface VA) that is at the outer side of the virtual display region HA due to the inter-vehicle distance between the vehicle 12 and the preceding vehicle 40 becoming long, it is easy for the display control device 10 to display the ACC image VIacc that corresponds to the preceding vehicle 40 in the virtual display region HA.

Figure 12:
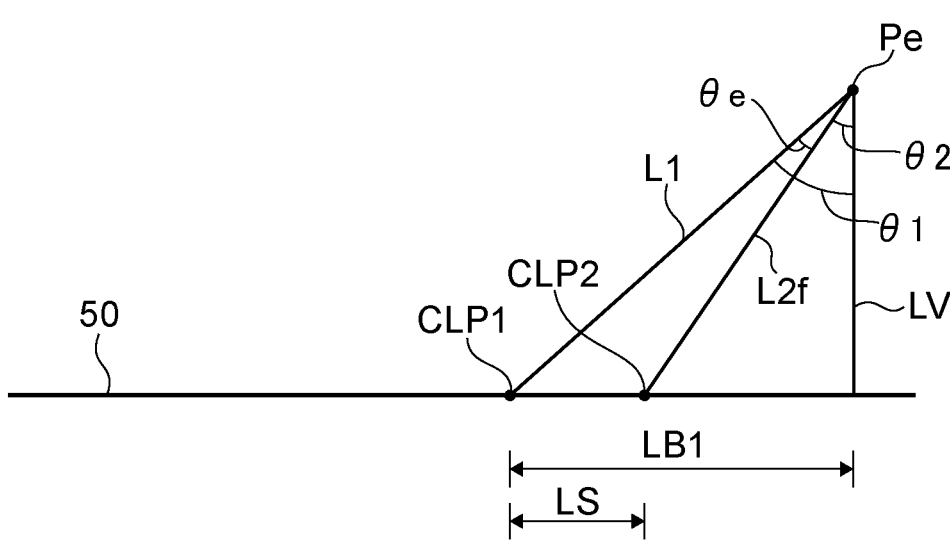
FIG. 12 is a drawing for explaining the distance between the preceding vehicle and an ACC image perceived by the driver in a case in which the inter-vehicle distance is short.
Figure 13:
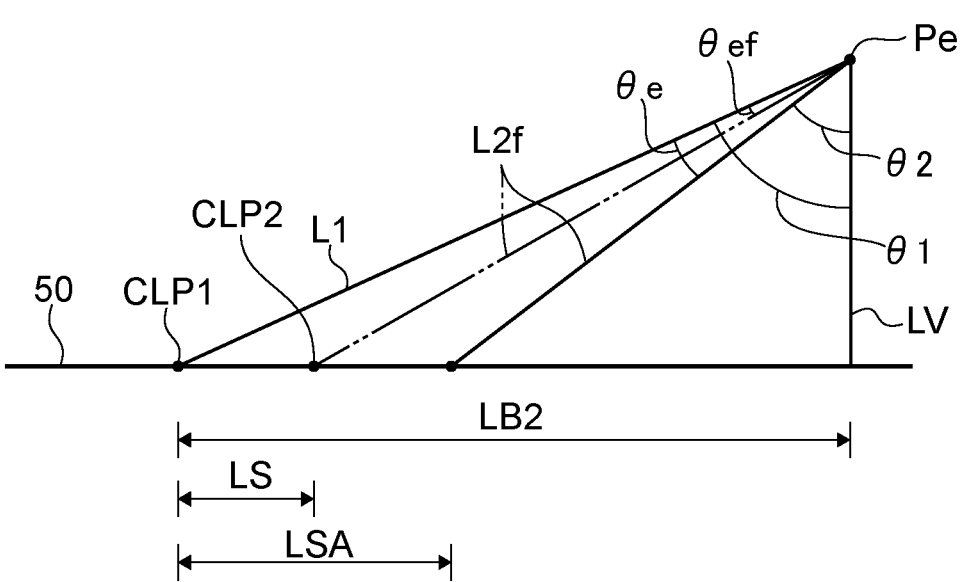
FIG. 13 is a drawing for explaining the distance between the preceding vehicle and the ACC image perceived by the driver in a case in which the inter-vehicle distance is long.

Moreover, in a case in which the amount of change in angle $\theta e$, which is formed by the first straight line L1 and the straight line L2$f$ illustrated in FIG. 12 and FIG. 13, at the time when the inter-vehicle distance between the vehicle 12 and the preceding vehicle 40 changes is small, it is difficult for the driver D to feel that the distance between the ACC image VIacc and the preceding vehicle 40 is changing. In other words, in a case in which the amount of change in the angle $\theta e$ is large, it is easy for the driver D to feel that the distance between the ACC image VIacc and the preceding vehicle 40 is changing. Note that the angle $\theta e$ is a value obtained by subtracting angle $\theta 2$, which is formed by the straight line L2$f$ and straight line LV in the vertical direction that passes through the eyeball reference position Pe, from angle $\theta 1$ that is formed by the first straight line L1 and straight line LV.

FIG. 12 illustrates a case in which the distance between the vehicle 12 and the preceding vehicle 40 is the inter-vehicle distance LB1. The distance at this time between intersection point CLP1 of the road 50 and the first straight line L1, and intersection point CLP2 of the road 50 and the straight line L2$f$, is LS. FIG. 13 illustrates a case in which the distance between the vehicle 12 and the preceding vehicle 40 is the inter-vehicle distance LB2. The straight line L2$f$ shown by the imaginary line is the straight line that passes-through the eyeball reference position Pe and the front end point Pf of the ACC image VIacc in a case in which the distance between the intersection point CLP1 and the intersection point CLP2 is LS. The angle formed by the first straight line L1 and the straight line L2$f$ in this case is Def. This angle Def is clearly larger than the angle $\theta e$ of FIG. 12. Therefore, if the distance LS does not change when the inter-vehicle distance changes from LB1 in FIG. 12 to LB2 in FIG. 13, it is easy for the driver D to feel that the distance between the ACC image VIacc and the preceding vehicle 40 is changing.

In contrast, in the present embodiment, the angle $\theta 2$ is set such that the distance between the intersection point CLP1 and the intersection point CLP2 becomes LSA, which is greater than LS, in a case in which the distance between the vehicle 12 and the preceding vehicle 40 is the inter-vehicle distance LB2. In other words, the position of the second intersection point CP2 in the virtual display region HA is controlled by the display control ECU 26 such that the distance between the intersection point CLP1 and the intersection point CLP2 becomes LSA and the distance between the intersection points becomes Lsp2. In this case, as illustrated in FIG. 13, the angle formed by the first straight line L1 and the straight line L2$f$ is a magnitude that is approximately the same as $\theta e$.

In this way, in the present embodiment, when the inter-vehicle distance between the vehicle 12 and the preceding vehicle 40 is long, the distances Lsp1, Lsp2, Lsp3 between the intersection points are long, and, when the inter-vehicle distance between the vehicle 12 and the preceding vehicle 40 is short, the distances Lsp1, Lsp2, Lsp3 between the intersection points are short. Therefore, when the inter-vehicle distance between the vehicle 12 and the preceding vehicle 40 changes, it is difficult for the driver D to feel that the distance between the ACC image VIacc and the preceding vehicle 40 is changing.

Although the display control device 10, the display control method and the program relating to the present embodiment have been described above, appropriate changes in design can be made thereto within a scope that does not depart from the gist of the present disclosure.

For example, the AR image that corresponds to the relatively moving body that moves relative to the vehicle 12 at the front of the vehicle 12 may be different than the ACC image VIacc. For example, this AR image may be an AR image corresponding to a pedestrian. Or, this AR image may be a relatively moving object that is positioned in front of the vehicle 12 and is fixed to the road surface. Such relatively moving objects include, for example, stop lines and vehicle lanes (demarcating lines) that are drawn on the road surface.

The distance between the intersection points may be changed in a step-wise manner in accordance with the length of the inter-vehicle distance between the vehicle 12 and the preceding vehicle 40. For example, the distance between the intersection points may be set to Lsp1 in a case in which the inter-vehicle distance is 30 m or less, and the distance between the intersection points may be set to Lsp2 in a case in which the inter-vehicle distance is longer than 30 m and less than or equal to 60 m, and the distance between the intersection points may be set to Lsp3 in a case in which the inter-vehicle distance is longer than 60 m.

The ACC image VIacc may be a 2D AR image.

When the vehicle 12 executes CACC, the ACC image VIacc corresponding to the preceding vehicle may be formed.

[Notes]

The display control device of the present disclosure may be an arbitrary combination of following structure 1 through structure 3.

<Structure 1> A display control device installed in a vehicle and forming, in a virtual display region set in front of the vehicle, an AR image corresponding to a relatively moving body that is positioned ahead of the vehicle and moves relative to the vehicle, wherein, given that an intersection point of a straight line, which connects the relatively moving body and an eyeball reference position of a driver of the vehicle, and a virtual surface, which includes the virtual display region and is wider than the virtual display region, is defined as a first intersection point, and an intersection point between the virtual display region and a straight line, which connects the eyeball reference position and the AR image, is defined as a second intersection point, the display control device controls a position of the second intersection point such that a second distance, which is a distance between the first intersection point and the second intersection point, is longer when a first distance, which is a distance between the relatively moving body and the vehicle, is longer than a predetermined value, than when the first distance is the predetermined value.

<Structure 2> The display control device wherein, the longer the first distance is, the longer the second distance is made to be.

<Structure 3> The display control device wherein the second distance is changed in steps, in accordance with a length of the first distance.

Moreover, the display control method of the present disclosure may be a combination of following structure 4 and at least one of structures 1 through 3.

<Structure 4> A display control method forming, in a virtual display region set in front of a vehicle, an AR image corresponding to a relatively moving body that is positioned ahead of the vehicle and moves relative to the vehicle, wherein, given that an intersection point of a straight line, which connects the relatively moving body and an eyeball reference position of a driver of the vehicle, and a virtual surface, which includes the virtual display region and is wider than the virtual display region, is defined as a first intersection point, and an intersection point between the virtual display region and a straight line, which connects the eyeball reference position and the AR image, is defined as a second intersection point, the display control method controls a position of the second intersection point such that a second distance, which is a distance between the first intersection point and the second intersection point, is longer when a first distance, which is a distance between the relatively moving body and the vehicle, is longer than a predetermined value, than when the first distance is the predetermined value.

Moreover, the program of the present disclosure may be a combination of following structure 5 and at least one of structures 1 through 3.

<Structure 5> A program causing a computer to execute a processing of forming, in a virtual display region set in front of a vehicle, an AR image corresponding to a relatively moving body that is positioned ahead of the vehicle and moves relative to the vehicle, wherein, given that an intersection point of a straight line, which connects the relatively moving body and an eyeball reference position of a driver of the vehicle, and a virtual surface, which includes the virtual display region and is wider than the virtual display region, is defined as a first intersection point, and an intersection point between the virtual display region and a straight line, which connects the eyeball reference position and the AR image, is defined as a second intersection point, the program causes the computer to execute a processing of controlling a position of the second intersection point such that a second distance, which is a distance between the first intersection point and the second intersection point, is longer when a first distance, which is a distance between the relatively moving body and the vehicle, is longer than a predetermined value, than when the first distance is the predetermined value.

What is claimed is:

1. A display control device installed in a vehicle and forming, in a virtual display region set in front of the vehicle, an Augmented Reality (AR) image corresponding to a moving body that is positioned ahead of the vehicle and moves relative to the vehicle, the display control device comprising an Electronic Control Unit configured to:

calculate a first intersection point that is a point at which (1) a first straight line that connects the moving body and an eyeball reference position of a driver of the vehicle intersects (2) a virtual surface that includes the virtual display region and is wider than the virtual display region;

calculate a second intersection point that is a point at which (i) the virtual display region intersects (ii) a second straight line that connects the eyeball reference position and the AR image; and control the AR image to change a position of the second intersection point so that, as a first distance that is a distance between the moving body and the vehicle increases, a second distance that is a distance between the first intersection point and the second intersection point increases, wherein as the first distance increases, which causes a position of the first intersection point to move upward relative to the virtual display region, which is fixed, the Electronic Control Unit controls the AR image to cause the position of the second intersection point to move upward while increasing the second distance, and when the Electronic Control Unit controls the AR image to change the position of the second intersection point, the Electronic Control Unit continually increases the second distance as the first distance increases, and causes an entirety of the AR image to move without changing any size and any appearance of the AR image so that as the AR image moves the size and the appearance of the AR image before moving are identical to the size and the appearance of the AR image after the moving.

2. A display control method forming, in a virtual display region set in front of a vehicle, an Augmented Reality (AR) image corresponding to a moving body that is positioned ahead of the vehicle and moves relative to the vehicle, the display control method executed by a processor and comprising:

calculating a first intersection point that is a point at which (1) a first straight line that connects the moving body and an eyeball reference position of a driver of the vehicle intersects (2) a virtual surface that includes the virtual display region and is wider than the virtual display region;

calculating a second intersection point that is a point at which (i) the virtual display region intersects (ii) a second straight line that connects the eyeball reference position and the AR image; and controlling the AR image to change a position of the second intersection point so that, as a first distance that is a distance between the moving body and the vehicle increases, a second distance that is a distance between the first intersection point and the second intersection point increases, wherein as the first distance increases, which causes a position of the first intersection point to move upward relative to the virtual display region, which is fixed, the AR image is controlled to cause the position of the second intersection point to move upward while increasing the second distance, and when the AR image is controlled to change the position of the second intersection point, the AR image is controlled to continually increase the second distance as the first distance increases, and an entirety of the AR image is moved without changing any size and any appearance of the AR image so that as the AR image moves the size and the appearance of the AR image before moving are identical to the size and the appearance of the AR image after the moving.

3. A non-transitory computer-readable storage medium storing a program that causes a computer to execute a processing of forming, in a virtual display region set in front of a vehicle, an Augmented Reality (AR) image corresponding to a moving body that is positioned ahead of the vehicle and moves relative to the vehicle, the processing comprising:

calculating a first intersection point that is a point at which (1) a first straight line that connects the moving body and an eyeball reference position of a driver of the vehicle intersects (2) a virtual surface that includes the virtual display region and is wider than the virtual display region;

calculating a second intersection point that is a point at which (i) the virtual display region intersects (ii) a second straight line that connects the eyeball reference position and the AR image; and controlling the AR image to change a position of the second intersection point so that, as a first distance that is a distance between the moving body and the vehicle increases, a second distance that is a distance between the first intersection point and the second intersection point increases, wherein as the first distance increases, which causes a position of the first intersection point to move upward relative to the virtual display region, which is fixed, the AR image is controlled to cause the position of the second intersection point to move upward while increasing the second distance, and when the AR image is controlled to change the position of the second intersection point, the AR image is controlled to continually increase the second distance as the first distance increases, and an entirety of the AR image is moved without changing any size and any appearance of the AR image so that as the AR image moves the size and the appearance of the AR image before moving are identical to the size and the appearance of the AR image after the moving.

\* \* \* \* \*